(12) United States Patent
Shim et al.

(10) Patent No.: US 12,256,887 B2
(45) Date of Patent: Mar. 25, 2025

(54) MOBILE ROBOT USING ARTIFICIAL INTELLIGENCE AND CONTROLLING METHOD THEREOF

(71) Applicant: LG ELECTRONICS INC., Seoul (KR)

(72) Inventors: Jungmin Shim, Seoul (KR); Jieun Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 380 days.

(21) Appl. No.: 17/597,354

(22) PCT Filed: Jul. 2, 2020

(86) PCT No.: PCT/KR2020/008663
§ 371 (c)(1),
(2) Date: Jan. 4, 2022

(87) PCT Pub. No.: WO2021/006542
PCT Pub. Date: Jan. 14, 2021

(65) Prior Publication Data
US 2022/0257074 A1    Aug. 18, 2022

(30) Foreign Application Priority Data
Jul. 5, 2019   (KR) .................. 10-2019-0081460

(51) Int. Cl.
*A47L 9/28*    (2006.01)
*A47L 9/00*    (2006.01)
(Continued)

(52) U.S. Cl.
CPC .............. *A47L 9/2805* (2013.01); *A47L 9/009* (2013.01); *A47L 9/2852* (2013.01);
(Continued)

(58) Field of Classification Search
CPC ...... A47L 9/2805; A47L 9/009; A47L 9/2852; A47L 9/2873; A47L 9/2884; A47L 9/322;
(Continued)

(56) References Cited

U.S. PATENT DOCUMENTS

| 7,211,980 B1 | 5/2007 | Bruemmer et al. |
| 10,188,255 B2 | 1/2019 | Lee et al. |

(Continued)

FOREIGN PATENT DOCUMENTS

| CN | 104055462 A | 9/2014 |
| EP | 2 781 981 A2 | 9/2014 |

(Continued)

OTHER PUBLICATIONS

English translation of KR20120091937A (Year: 2012).*

*Primary Examiner* — Dominic J Bologna
(74) *Attorney, Agent, or Firm* — Birch, Stewart, Kolasch & Birch, LLP

(57) ABSTRACT

A mobile robot of the present disclosure includes: a traveling unit configured to move a main body; a lidar sensor configured to acquire terrain information outside the main body; a camera sensor configured to acquire an image outside the main body; and a controller configured to fuse the image and a detection signal of the lidar sensor to select a front edge for the next movement and set a target location of the next movement at the front edge to perform mapping travelling. Therefore, in a situation where there is no map, the mobile robot can provide an accurate map with a minimum speed change when travelling while drawing the map.

15 Claims, 11 Drawing Sheets

(51) Int. Cl.
| | |
|---|---|
| *A47L 9/32* | (2006.01) |
| *A47L 11/40* | (2006.01) |
| *B25J 9/00* | (2006.01) |
| *B25J 9/16* | (2006.01) |
| *B25J 11/00* | (2006.01) |
| *B25J 13/08* | (2006.01) |
| *B25J 19/02* | (2006.01) |
| *G01S 13/00* | (2006.01) |
| *G05D 1/242* | (2024.01) |
| *G05D 1/243* | (2024.01) |
| *G05D 1/246* | (2024.01) |
| *G05D 1/622* | (2024.01) |

(52) U.S. Cl.
CPC ........... *A47L 9/2873* (2013.01); *A47L 9/2884* (2013.01); *A47L 9/322* (2013.01); *A47L 11/4061* (2013.01); *B25J 9/0003* (2013.01); *B25J 9/161* (2013.01); *B25J 9/1666* (2013.01); *B25J 9/1676* (2013.01); *B25J 11/0085* (2013.01); *B25J 13/08* (2013.01); *B25J 19/022* (2013.01); *B25J 19/023* (2013.01); *G01S 13/00* (2013.01); *G05D 1/242* (2024.01); *G05D 1/2427* (2024.01); *G05D 1/243* (2024.01); *G05D 1/2462* (2024.01); *G05D 1/622* (2024.01); *A47L 2201/04* (2013.01)

(58) Field of Classification Search
CPC ............. A47L 11/4061; A47L 2201/04; A47L 2201/02; B25J 9/0003; B25J 9/161; B25J 9/1666; B25J 9/1676; B25J 11/0085; B25J 13/08; B25J 19/022; B25J 19/023; G01S 13/00; G05D 1/242; G05D 1/2427; G05D 1/243; G05D 1/2462; G05D 1/622; G05D 2111/10; G05D 2111/17; G05D 2111/67; G05D 2105/10; G05D 2107/40; G05D 2109/10; G05B 2219/39271; G05B 2219/40411; G05B 2219/45098
See application file for complete search history.

(56) References Cited

U.S. PATENT DOCUMENTS

| | | | |
|---|---|---|---|
| 2007/0100498 A1* | 5/2007 | Matsumoto | G06N 3/008 701/23 |
| 2014/0288709 A1* | 9/2014 | Sim | G05D 1/024 700/259 |
| 2018/0147717 A1 | 5/2018 | Xie | |

FOREIGN PATENT DOCUMENTS

| | | | |
|---|---|---|---|
| JP | 2017-123065 A | | 7/2017 |
| KR | 10-2008-0090925 A | | 10/2008 |
| KR | 20120091937 A | * | 8/2012 |
| KR | 10-1242252 B1 | | 3/2013 |
| KR | 10-1395888 B1 | | 5/2014 |
| KR | 10-1553654 B1 | | 10/2015 |
| KR | 10-2019-0024467 A | | 3/2019 |
| WO | WO 2018/196001 A1 | | 11/2018 |

* cited by examiner

MOBILE ROBOT USING ARTIFICIAL INTELLIGENCE AND CONTROLLING METHOD THEREOF

TECHNICAL FIELD

The present disclosure relates to the mobile robot and a method for controlling the mobile robot, and more particularly, to a method of detecting the mobile robot using artificial intelligence and corresponding travelling technology.

BACKGROUND

Robots have been developed for industrial use and have been a part of factory automation.

In recent years, the application of robots has been further expanded, medical robots, aerospace robots, and the like have been developed, and home robots that can be used in general homes have also been manufactured. Among these robots, a robot capable of traveling by itself is called the mobile robot. A representative example of the mobile robot used in home is a robot cleaner.

Various technologies for detecting an environment and a user around the robot cleaner through various sensors provided in the robot cleaner are known. In addition, technologies which allow the robot cleaner to learn and map a traveling area by itself and to determine a current position on a map are known. A robot cleaner that travels and cleans a traveling area in a preset manner is known.

In addition, in the prior art (Korean Patent Publication No. 10-2008-0090925), a technique of performing a pattern driving in a zigzag manner along a wall surface running on the outside of the area while driving the area to be cleaned by itself is disclosed.

On the other hand, when the robot cleaner performs mapping, it is desired to determine an obstacle and to avoid the obstacle and to travel when there is an obstacle.

In the prior art (US registered U.S. Pat. No. 7,211,980B1), the robot receives a target direction and senses whether there is the obstacle in the front, and if there is the obstacle in the front, Techniques for adjusting at least one of the rotational direction, rotational speed, switching direction, and switching speed to avoid the nearest obstacle are disclosed. However, in the case of such a prior art, it is difficult to respond to the obstacle that the robot does not recognize or the obstacle that has no directionality by travelling with simple logic according to the recognized position of the obstacle. In addition, in the case of the prior art, when the obstacle is complicated by focusing on the avoidance of the obstacle, there is a problem that may show inefficient movement.

SUMMARY

Technical Problem

A first object is to draw an accurate map with a minimum speed change when the robot cleaner is travelling to draw the map while there is no map.

On the other hand, if the path of the robot cleaner is obstructed by the obstacle, an operation for avoiding it is performed, and a sudden change may occur depending on the situation. The second object of the present disclosure is to find a space free of obstacles and move along a center point of the space free of obstacles to prevent contact with the obstacles.

In addition, the third object of the present disclosure is to provide the robot cleaner capable of preventing errors while progressing an operation of creating the map by minimizing the sudden change of direction and gently changing the direction by preventing contact with the obstacle while drawing the map.

On the other hand, the fourth object of the present disclosure is to provide a mapping travelling capable of performing travelling without collision by acquiring surrounding information through a rider, a camera, and other sensors in the mapping process of the robot cleaner.

Technical Solution

In an aspect, there is provided the mobile robot including: a traveling unit configured to move a main body; a lidar sensor configured to acquire terrain information outside the main body; a camera sensor configured to acquire an image outside the main body; and a controller configured to fuse the image and a detection signal of the lidar sensor to select a front edge for the next movement and set a target location of the next movement at the front edge to perform mapping travelling.

The controller acquires a candidate edge screen for four directions of the mobile robot from the image and the detection signal of the lidar sensor and selects one of the candidate edge screens as the front edge.

The controller selects, as the front edge, that there are no obstacles in the straight direction of the mobile robot among the candidate edge screens.

The controller senses by reducing the diameter of the lidar sensor when an angle of arc drawn by the detection signal of the lidar sensor on the candidate edge screen is smaller than a threshold angle.

When one of start point and end point of the arc of the detection signal detected by setting the diameter of the lidar sensor to a first distance blocks the front surface of the mobile robot, the controller senses by setting the diameter of the lidar sensor as a second distance smaller than the first distance.

The first distance is 4 m, and the second distance is 2 m.

When the start point of the arc of the detection signal with respect to center line of the mobile robot in the candidate edge screen has a greater angle with respect to the center line than the end point, the controller sets the candidate edge as the front edge.

The controller selects the candidate edge where any one of the start point or the end point of the arc of the detection signal is within a threshold range with respect to the center line of the mobile robot as the front edge.

When there are two or more candidate edges where any one of the start point and the end point of the arc of the detection signal is present, the controller selects the candidate edge closer to the center line as the front edge.

When the start point and the end point are not present at the rear of the mobile robot with respect to the front edge, the controller sets the target between the start point and the end point.

When the start point or the end point is present at the rear of the mobile robot with respect to the front edge, the controller determines whether the other of the start point or end point is within a predetermined distance from the center line of the mobile robot.

When the start point or the end point is present at the rear of the mobile robot with respect to the front edge, and the other of the start point or end point is within the predetermined distance from the center line of the mobile robot, the controller sets the target to be out of the predetermined distance from the center line.

The controller controls to perform a central movement for the obstacle when the mobile robot moves straight toward the target.

The controller obtains the detection signal from the lidar sensor and the image and performs mapping to travelling area when the mobile robot moves straight.

The mobile robot further comprises an ultrasonic sensor to determine the presence or absence of the obstacle located in front by ultrasonic radiation, and wherein the controller avoids the obstacle when traveling toward the target according to a detection signal from the ultrasonic sensor.

In another aspect, there is provided a method of controlling the mobile robot to perform cleaning while moving a main body, the method comprising: acquiring terrain information outside a main body of the mobile robot through a lidar sensor; obtaining images outside the main body through a camera sensor; generating candidate edges for a plurality of directions of the mobile robot based on a detection signal of the lidar sensor and the images; selecting a front edge among the candidate edges for the plurality of directions; setting a target location at the front edge; and performing travelling to the target location.

The selecting the front edge is selects, as the front edge, that there are no obstacles in the straight direction of the mobile robot among the candidate edge.

The selecting the front edge is extracting the candidate edge by reducing a diameter of the lidar sensor to sense when an angle of an arc drawn by the detection signal of the lidar sensor on the candidate edge is smaller than a threshold angle.

When one of start point and end point of the arc of the detection signal detected by setting the diameter of the lidar sensor to a first distance blocks the front surface of the mobile robot, the selecting the front edge is sensing by setting the diameter of the lidar sensor as a second distance smaller than the first distance.

When the start point of the arc of the detection signal with respect to center line of the mobile robot in the candidate edge screen has a greater angle with respect to the center line than the end point, the selecting the front edge is setting the candidate edge as the front edge.

Advantageous Effects

Through the above solution, the robot cleaner can provide the accurate map with a minimum speed change when the robot cleaner is travelling to draw the map while there is no map.

Moreover, the robot cleaner can find a space free of obstacles and move along a center point of the space free of obstacles to prevent contact with the obstacles.

In addition, the robot cleaner can prevent errors while progressing an operation of creating the map by minimizing the sudden change of direction and gently changing the direction by preventing contact with the obstacle while drawing the map.

And, mapping travelling can be performed without collision by acquiring surrounding information through a rider, a camera, and other sensors in the mapping process of the robot cleaner.

Meanwhile, various other effects will be disclosed directly or implicitly in a detailed description according to an embodiment of the present disclosure to be described later.

DETAILED DESCRIPTION

Figure 1:
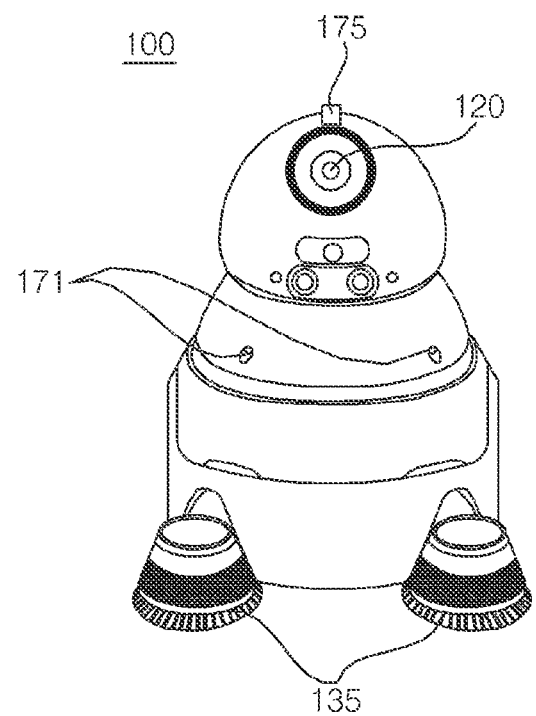
FIG. 1 is a front view of the mobile robot according to an embodiment of the present disclosure.

Hereinafter, embodiments of the present disclosure will be described in detail with reference to the accompanying drawings. However, the present disclosure is not limited to these embodiments and can be modified in various forms.

On the other hand, the suffixes "module" and "part" for the components used in the following description are given simply by considering the ease of writing the present specification, and do not impart a particularly important meaning or role in itself. Therefore, the "module" and the "unit" may be used interchangeably.

Further, in this specification, terms such as first and second may be used to describe various elements, but these elements are not limited by these terms. These terms are only used to distinguish one element from another.

The mobile robot 100 according to an embodiment of the present disclosure means a robot capable of moving itself using a wheel or the like, and may be a home helper robot and a robot cleaner. Hereinafter, referring to the drawings, a robot cleaner having a cleaning function among mobile robots will be described as an example, but the present disclosure is not limited thereto.

The mobile robot means a robot capable of moving itself using wheels or the like. Therefore, the mobile robot may be a guide robot, a cleaning robot, an entertainment robot, a home helper robot, a security robot, and the like, which can move by itself, and the present disclosure is not limited to the type of the mobile robot.

Hereinafter, embodiments of the present disclosure will be described in detail with reference to the accompanying drawings. However, the present disclosure is not limited to these embodiments and can be modified in various forms.

On the other hand, the suffixes "module" and "part" for the components used in the following description are given simply by considering the ease of writing the present specification, and do not impart a particularly important meaning or role in itself. Therefore, the "module" and the "unit" may be used interchangeably.

Further, in this specification, terms such as first and second may be used to describe various elements, but these elements are not limited by these terms. These terms are only used to distinguish one element from another.

The mobile robot 100 according to an embodiment of the present disclosure means a robot capable of moving itself using a wheel or the like, and may be a home helper robot and a robot cleaner. Hereinafter, referring to the drawings, a robot cleaner having a cleaning function among mobile robots will be described as an example, but the present disclosure is not limited thereto.

The mobile robot means a robot capable of moving itself using wheels or the like. Therefore, the mobile robot may be a guide robot, a cleaning robot, an entertainment robot, a home helper robot, a security robot, and the like, which can move by itself, and the present disclosure is not limited to the type of the mobile robot.

FIG. 1 shows an embodiment of the present disclosure, the mobile robot that is a cleaning robot.

The mobile robot 100 may be provided with a cleaning mechanism 135*d* such as a brush to clean a specific space while moving itself.

The mobile robot 100 includes sensing units 170: 171 and 175 capable of detecting information about the surroundings.

The mobile robot 100 effectively fuses vision-based location recognition using a camera and rider-based location recognition technology using a laser to perform robust location recognition and map generation against environmental changes such as illumination changes and product location changes.

The image acquiring unit 120 photographs a travelling area, and may include one or more camera sensors for acquiring an image outside the main body.

In addition, the image acquisition unit 120 may include a camera module. The camera module may include a digital camera. The digital camera includes at least one optical lens, an image sensor (for example, a CMOS image sensor) composed of a plurality of photodiodes (for example, pixels) imaged by light passing through the optical lens, and a digital signal processor (DSP) that composes an image based on a signal output from photodiodes. The digital signal processor is capable to generate not only a still image but also a moving image composed of frames composed of still images.

In the present embodiment, the image acquisition unit 120 includes a front camera sensor provided to acquire an image in front of the main body, but the location and the photographing range of the image acquisition unit 120 are not necessarily limited thereto.

For example, the mobile robot 100 may include only a camera sensor that acquires an image of the front in the travelling area and perform vision-based location recognition and travelling.

Alternatively, the image acquisition unit 120 of the mobile robot 100 according to an embodiment of the present disclosure may include a camera sensor (not shown) that is disposed obliquely with respect to one surface of the main body and configured to photograph the front side and the top side together. That is, it is possible to photograph both the front side and the top side with a single camera sensor. In this case, the controller 140 may separate the front image and the upper image from the image acquired by the camera based on the angle of view. The separated front image may be used for vision-based object recognition with the image obtained from the front camera sensor. In addition, the separated upper image may be used for vision-based location recognition and travelling with the image acquired from an upper camera sensor.

The mobile robot 100 according to the present disclosure may perform a vision slam that recognizes the current location by comparing surrounding images with image-based pre-stored information or comparing acquired images.

Meanwhile, the image acquisition unit 120 may also include a plurality of front camera sensors and/or upper camera sensors. Alternatively, the image acquisition unit 120 may be provided with a plurality of camera sensors (not shown) configured to photograph the front and the top together.

In the case of this embodiment, a camera is installed on a part of the mobile robot 100 (ex, front, rear, bottom), and the acquired image can be continuously acquired during cleaning. Multiple cameras may be installed for each part to improve photographing efficiency. The image acquired by the camera can be used to recognize the type of material, such as dust, hair, floor, etc. in the space, whether to clean, or when to clean.

The front camera sensor may photograph a situation of an obstacle or a cleaning area existing in the front of the traveling direction of the mobile robot 100.

According to an embodiment of the present disclosure, the image acquisition unit 120 may acquire a plurality of images by continuously photographing the periphery of the main body, and the obtained plurality of images may be stored in a storage unit.

The mobile robot 100 may increase the accuracy of obstacle recognition by using a plurality of images or may increase the accuracy of obstacle recognition by selecting one or more images from a plurality of images and using effective data.

The sensing unit 170 may include a lidar sensor 175 that acquires terrain information outside the main body 110 using a laser.

The lidar sensor 175 outputs the laser to provide information such as a distance, a location direction, and a material of the object that reflects the laser and can acquire terrain information of the travelling area. The mobile robot 100 may obtain 360-degree geometry information using the lidar sensor 175.

The mobile robot 100 according to the embodiment of the present disclosure may grasp the distance, location, and direction of objects sensed by the lidar sensor 175 and generate a map while travelling accordingly.

The mobile robot 100 according to the embodiment of the present disclosure may acquire terrain information of the travelling area by analyzing the laser reception pattern such as a time difference or signal intensity of the laser reflected and received from the outside. In addition, the mobile robot 100 may generate the map using terrain information acquired through the lidar sensor 175.

For example, the mobile robot 100 according to the present disclosure compares the surrounding terrain information acquired from the lidar sensor 175 at the current location with the lidar sensor-based pre-stored terrain information or compares the acquired terrain information to perform a lidar slam that recognizes the current location.

More preferably, the mobile robot 100 according to the present disclosure effectively fuses vision-based location recognition using the camera and the lidar-based location recognition technology using the laser, and it can perform location recognition and map generation that are robust to environmental changes, such as changes in illuminance or changes in the location of the object.

Meanwhile, the sensing unit 170 may include sensors 171 for sensing various data related to the operation and state of the mobile robot 100.

For example, the sensing unit 170 may include an obstacle detection sensor 171 that detects an obstacle in front. In addition, the sensing unit 170 may further include a cliff detection sensor for detecting the presence of a cliff on the floor in the travelling area, and a lower camera sensor for acquiring an image of the floor.

Referring to FIG. 1, the obstacle detection sensor 171 may include a plurality of sensors installed at regular intervals on the outer circumferential surface of the mobile robot 100.

The obstacle detection sensor 171 may include an infrared sensor, an ultrasonic sensor, an RF sensor, a geomagnetic sensor, a Location Sensitive Device (PSD) sensor, and the like.

Meanwhile, the location and type of the sensor included in the obstacle detection sensor 171 may vary depending on the type of the mobile robot 100, and the obstacle detection sensor 171 may include more various sensors.

The obstacle detection sensor 171 is a sensor that detects a distance from an indoor wall or the obstacle, and the present disclosure is not limited to that type but will be described below by using an ultrasonic sensor.

The obstacle detection sensor 171 detects the object, particularly an obstacle, present in the travelling (movement) direction of the mobile robot 100 and transmits obstacle information to the controller 140. That is, the obstacle detection sensor 171 may detect a projecting object, an object in the house, furniture, a wall, a wall edge, and the like, present on a movement path of the mobile robot 100, in the front or side, and transmit the information to the controller 140.

The mobile robot 100 may be provided with a display (not shown) to display a predetermined image such as a user interface screen. In addition, the display may be configured as a touch screen and used as an input means.

In addition, the mobile robot 100 may receive user input through touch, voice input, or the like, and display information on the object and a place corresponding to the user input on the display screen.

The mobile robot 100 may perform an assigned task, that is, cleaning while travelling in a specific space. The mobile robot 100 may perform autonomous travelling that generates a path to a predetermined destination on its own and travels and following travelling that moves while following a person or another robot. In order to prevent the occurrence of a safety accident, the mobile robot 100 can travel while detecting and avoiding the obstacle during movement based on the image data acquired through the image acquisition unit 120 and the detection data obtained from the sensing unit 170.

The mobile robot 100 of FIG. 1 is capable of providing cleaning services in various spaces, for example, spaces such as airports, hotels, marts, clothing stores, logistics, hospitals, and especially large areas such as commercial spaces.

The mobile robot 100 may be linked to a server (not shown) that can manage and control it.

The server can remotely monitor and control the states of the plurality of robots 100 and provide effective service.

The mobile robot 100 and the server may be provided with communication means (not shown) supporting one or more communication standards to communicate with each other. In addition, the mobile robot 100 and the server may communicate with a PC, a mobile terminal, and other external servers. For example, the mobile robot 100 and the server may communicate using a Message Queuing Telemetry Transport (MQTT) method or a HyperText Transfer Protocol (HTTP) method. In addition, the mobile robot 100 and the server may communicate with a PC, a mobile terminal, or another server outside using the HTTP or MQTT method.

In some cases, the mobile robot 100 and the server support two or more communication standards and may use an optimal communication standard according to the type of communication data and the type of devices participating in the communication.

The server is implemented as a cloud server, and a user can use data stored and functions and services provided by the server through the server connected to various devices such as a PC and a mobile terminal.

The user can check or control information about the mobile robot 100 in the robot system through the PC, the mobile terminal, or the like.

In this specification, 'user' is a person who uses a service through at least one robot, an individual customer who purchases or rents a robot and uses it at home, and a manager of a company that provides services to employees or customers using the robot, the employees and the customers using the services provided by the company. Accordingly, the 'user' may include an individual customer (Business to Consumer: B2C) and an enterprise customer (Business to Business: B2B).

The user can monitor the status and location of the mobile robot 100 through the PC, the mobile terminal, and the like, and manage content and a work schedule. Meanwhile, the server may store and manage information received from the mobile robot 100 and other devices.

The mobile robot 100 and the server may be provided with communication means (not shown) supporting one or more communication standards to communicate with each other. The mobile robot 100 may transmit data related to space, objects, and usage to the server.

Here, the data related to the space and object are data related to the recognition of the space and objects recognized by the robot 100, or image data for the space and the object obtained by the image acquisition unit 120.

According to the embodiment, the mobile robot 100 and the server include artificial neural networks (ANN) in the form of software or hardware learned to recognize at least one of the user, a voice, an attribute of space, and attributes of objects such as the obstacle.

According to the embodiment of the present disclosure, the robot 100 and the server may include deep neural networks (Deep) such as Convolutional Neural Network (CNN), Recurrent Neural Network (RNN), and Deep Belief Network (DBN), which are learned by Deep Learning. For example, the deep neural network structure (DNN) such as a convolutional neural network (CNN) may be installed on the controller (see 140 of FIG. 3) of the robot 100.

The server may transmit the updated deep neural network (DNN) structure data to the robot 100 after learning the deep neural network (DNN) based on data received from the mobile robot 100, or data input by the user, and the like. Accordingly, the deep neural network (DNN) structure of artificial intelligence provided by the mobile robot 100 may be updated.

In addition, usage-related data is data obtained according to the use of a predetermined product, for example, data acquired according to the use of the robot 100, and may include usage history data, sensing data obtained from the sensing unit 170, and the like.

The learned deep neural network structure (DNN) may receive input data for recognition, recognize attributes of people, objects, and spaces included in the input data, and output the result.

In addition, the learned deep neural network structure (DNN) may receive input data for recognition, analyze and learn usage-related data of the mobile robot 100, and recognize usage patterns, usage environments, and the like.

Figure 3:
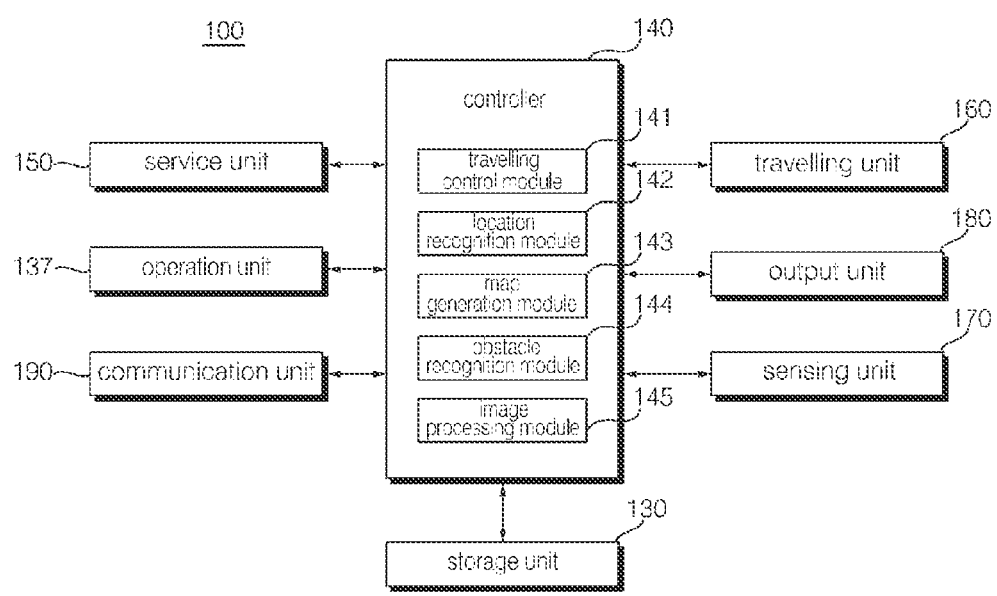
FIG. 3 is a block diagram showing a control relationship between main components of the mobile robot according to the embodiment of the present disclosure.

Meanwhile, data related to space, objects, and usage may be transmitted to the server through a communication unit (see 190 of FIG. 3).

Based on the received data, the server may train the deep neural network (DNN) and then transmit the updated deep neural network (DNN) structure data to the mobile robot 100 for updating.

Accordingly, the mobile robot 100 becomes smarter and provides a user experience (UX) that evolves as it is used.

The robot 100 and the server may also use external information. For example, the server may comprehensively use external information acquired from other linked service servers to provide an excellent user experience.

According to the present disclosure, the mobile robot 100 and/or the server can perform voice recognition, so that the user voice can be used as an input for controlling the robot 100.

Further, according to the present disclosure, the mobile robot 100 can provide a more diverse and active control function to the user by actively providing information or outputting a voice recommending a function or service.

Figure 2:
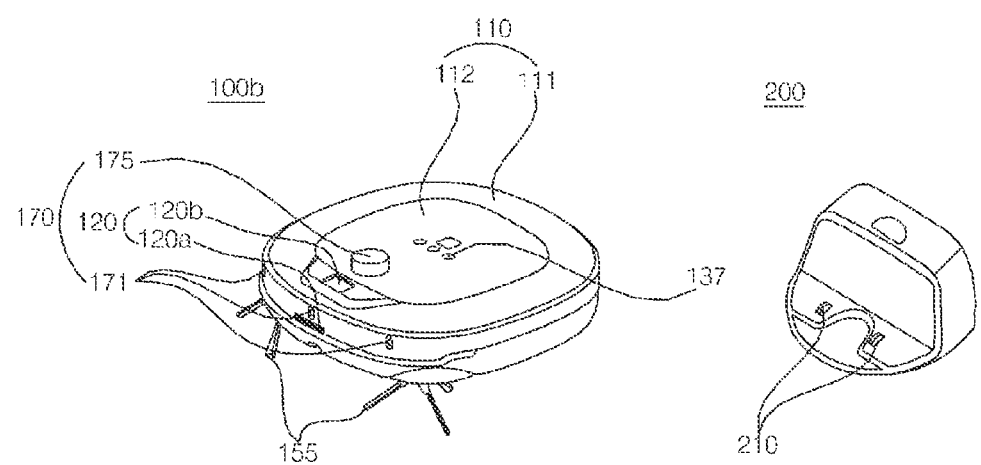
FIG. 2 is a perspective view showing the mobile robot and a charging stand for charging the mobile robot according to another embodiment of the present disclosure.

On the other hand, such the mobile robot 100 may be implemented in the embodiment shown in FIG. 2.

FIG. 2 is a perspective view showing the mobile robot and a charging stand for charging the mobile robot according to another embodiment of the present disclosure, and FIG. 3 is a block diagram showing a control relationship between main components of the mobile robot according to the embodiment of the present disclosure. The block diagram of FIG. 3 is applicable to both the mobile robot 100 of FIG. 1 and the mobile robot 100b of FIG. 2 and will be described below with the configuration of the mobile robot of FIG. 2.

Referring to FIG. 2, the mobile robot 100b includes a travelling unit 160 that moves the main body 110. The travelling unit 160 includes at least one travelling wheel 136 that moves the main body 110. The travelling unit 160 includes a travelling motor (not shown) connected to the travelling wheel 136 to rotate the travelling wheel. For example, the travelling wheels 136 may be provided on the left and right sides of the main body 110, respectively, hereinafter referred to as the left wheel L and the right wheel R, respectively.

The left wheel L and the right wheel R may be driven by one travelling motor, but a left wheel travelling motor driving the left wheel L and a right wheel travelling motor driving the right wheel R may be provided as needed. The travelling direction of the main body 110 can be switched to the left or right side by making a difference in the rotational speeds of the left wheel L and the right wheel R.

The mobile robots 100 and 100b include a service unit 150 for providing a predetermined service. FIGS. 1 and 2 illustrate the present disclosure as an example in which the service unit 150 performs a cleaning operation, but the present disclosure is not limited thereto. For example, the service unit 150 may be provided to provide a user with household services such as cleaning (scrubbing, suction cleaning, mopping, etc.), washing dishes, cooking, laundry, and garbage disposal. As another example, the service unit 150 may perform a security function for detecting external intruders or dangerous situations.

The mobile robots 100 and 100b may move the travelling area and clean the floor by the service unit 150. The service unit 150 includes an inhalation device for inhaling foreign substances, brushes 135 and 155 for performing the brushing, a dust container (not shown) for storing foreign substances collected by the inhalation device or brush, and/or a mop(not shown) for performing mopping.

In the bottom part of the main body 110 of the mobile robot 100b of FIG. 2, an intake port for inhalation of air may be formed, and in the main body 110, an inhalation device (Not shown) that provides inhalation force so that air can be inhaled through the intake port and a dust container (not shown) for collecting dust sucked with air through the intake port may be provided.

The main body 110 may include a case 111 forming a space in which various components constituting the mobile robot 100b are accommodated. An opening for inserting and removing the dust container may be formed in the case 111, and a dust container cover 112 that opens and closes the opening may be rotatably provided with respect to the case 111.

A roll-type main brush having brushes exposed through the intake port, and an auxiliary brush 155 locationed on the front side of the bottom surface of the main body 110 and having a plurality of blades extending radially may be provided. The rotation of these brushes 155 separates dust from the floor in the travelling area, and the dust separated from the floor is sucked through the intake port and collects in the dust container.

The battery supplies not only the driving motor, but also the power required for the overall operation of the mobile robot 100b. When the battery is discharged, the mobile robot 100b may perform travelling to return to the charging stand 200 for charging, and during such return travelling, the mobile robot 100b may detect the location of the charging stand 200 by itself.

The charging stand 200 may include a signal transmission unit (not shown) that transmits a predetermined return signal. The return signal may be an ultrasonic signal or an infrared signal, but is not limited thereto.

The mobile robot 100b of FIG. 2 may include a signal detection unit (not shown) that receives the return signal. The charging stand 200 may transmit the infrared signal through the signal transmission unit, and the signal detection unit may include an infrared sensor that detects the infrared signal. The mobile robot 100b moves to a location of the charging stand 200 according to the infrared signal transmitted from the charging stand 200 and docks the charging stand 200. By the docking, charging is performed between the charging terminal 133 of the mobile robot 100b and the charging terminal 210 of the charging stand 200.

The mobile robot 100b may include the sensing unit 170 that senses information inside/outside the mobile robot 100b.

For example, the sensing unit 170 may include one or more sensors 171 and 175 sensing various types of information about the travelling area, and an image acquiring unit 120 for obtaining image information about the travelling area. According to the embodiment, the image acquisition unit 120 may be separately provided outside the sensing unit 170.

The mobile robot 100b may map the travelling area through the information sensed by the sensing unit 170. For example, the mobile robot 100b may perform vision-based location recognition and map generation based on the ceiling image of the travelling area acquired by the image acquisition unit 120. In addition, the mobile robot 100b may perform location recognition and map generation based on a light detection and ranging (LiDAR) sensor 175 using a laser.

More preferably, the mobile robot 100*b* according to the present disclosure effectively fuses vision-based location recognition using a camera and laser-based lidar-based location recognition technology, thereby the robot 100*b* can perform location recognition and map generation that are robust to environmental changes, such as changes in illuminance and location of objects.

Meanwhile, the image acquisition unit 120 photographs the travelling area, and may include one or more camera sensors for acquiring an image outside the main body 110.

In addition, the image acquisition unit 120 may include a camera module. The camera module may include a digital camera. The digital camera includes at least one optical lens and an image sensor (for example, a CMOS image sensor) composed of a plurality of photodiodes (for example, pixels) imaged by light passing through the optical lens, and a digital signal processor (DSP) that composes an image based on a signal output from photodiodes. The digital signal processor can generate not only a still image but also a moving image composed of frames composed of still images.

In this embodiment, the image acquisition unit 120 is provided on the front camera sensor 120*a* provided to acquire an image in front of the main body 110 and an upper camera sensor 120*b* located in the upper surface portion of the main body 110 and provided to acquire the image of the ceiling in the travelling area but the location and photographing range of the image acquisition unit 120 are not necessarily limited thereto.

For example, the mobile robot 100*b* may be equipped with only the upper camera sensor 120*b* that acquires the image of the ceiling in the travelling area, and perform vision-based location recognition and travelling.

Alternatively, the image acquisition unit 120 of the mobile robot 100*b* according to the embodiment of the present disclosure may include a camera sensor (not shown) configured disposed inclined with respect to one surface of the main body 110 to photograph the front and the top together. That is, it is possible to photograph both the front side and the top side with a single camera sensor. In this case, the controller 140 may separate the front image and the upper image from the image acquired by the camera based on the angle of view. The separated front image may be used for vision-based object recognition, such as an image obtained from the front camera sensor 120*a*. In addition, the separated upper image may be used for vision-based location recognition and travelling, such as an image obtained from the upper camera sensor 120*b*.

The mobile robot 100*b* according to the present disclosure may perform a vision slam of recognizing the current location by comparing surrounding images with pre-stored information based on images or comparing acquired images.

On the other hand, the image acquisition unit 120 may be provided with a plurality of front camera sensor 120*a* and/or upper camera sensor 120*b*. Alternatively, the image acquisition unit 120 may be provided with a plurality of camera sensors (not shown) configured to photograph the front and the top together.

In the case of this embodiment, a camera is installed on a part of the mobile robot (ex, front, rear, and bottom), and the captured image can be continuously acquired during cleaning. Multiple cameras may be installed for each part for photographing efficiency. The image captured by the camera can be used to recognize the type of material such as dust, hair, floor, or the like present in the space, to check whether it is cleaned, or when to clean.

The front camera sensor 120*a* may photograph a situation of the obstacle existing in the front of the traveling direction of the mobile robot 100*b* or a cleaning area.

According to the embodiment of the present disclosure, the image acquisition unit 120 may acquire a plurality of images by continuously photographing the surroundings of the main body 110, and the obtained plurality of images may be stored in the storage unit 130.

The mobile robot 100*b* may increase the accuracy of obstacle recognition by using a plurality of images or may increase the accuracy of obstacle recognition by selecting one or more images from a plurality of images and using effective data.

The sensing unit 170 may include a lidar sensor 175 that acquires terrain information outside the main body 110 using a laser.

The lidar sensor 175 outputs a laser to provide information such as a distance, a location direction, and a material of an object that reflects the laser and can acquire terrain information of the travelling area. The mobile robot 100*b* may obtain 360-degree geometry information with the lidar sensor 175.

The mobile robot 100*b* according to the embodiment of the present disclosure may generate the map by grasping the distance, location, and direction of objects sensed by the lidar sensor 175.

The mobile robot 100*b* according to the embodiment of the present disclosure may acquire terrain information of the travelling area by analyzing a laser reception pattern such as a time difference or signal intensity of a laser reflected and received from the outside. In addition, the mobile robot 100*b* may generate the map using terrain information acquired through the lidar sensor 175.

For example, the mobile robot 100*b* according to the present disclosure may perform a lidar slam determining the moving direction by analyzing surrounding terrain information acquired at the current location through the lidar sensor 175.

More preferably, the mobile robot 100*b* according to the present disclosure may effectively recognize obstacles and generate the map by extracting an optimal moving direction with a small amount of change using a vision-based location recognition using the camera and a lidar-based location recognition technology using the laser and an ultrasonic sensor.

Meanwhile, the sensing unit 170 may include sensors 171, 172, and 179 that sense various data related to the operation and state of the mobile robot.

For example, the sensing unit 170 may include an obstacle detection sensor 171 that detects the obstacle in front. In addition, the sensing unit 170 may further include a cliff detection sensor 172 that detects the presence of a cliff on the floor in the travelling area, and a lower camera sensor 179 that acquires an image of the floor.

The obstacle detection sensor 171 may include a plurality of sensors installed at regular intervals on the outer circumferential surface of the mobile robot 100*b*.

The obstacle detection sensor 171 may include an infrared sensor, an ultrasonic sensor, an RF sensor, a geomagnetic sensor, a Location Sensitive Device (PSD) sensor, and the like.

Meanwhile, the location and type of the sensor included in the obstacle detection sensor 171 may vary depending on the type of the mobile robot, and the obstacle detection sensor 171 may include more various sensors.

The obstacle detection sensor 171 is a sensor that detects a distance from an indoor wall or the obstacle, and the present disclosure is not limited to that type but will be described below by using an ultrasonic sensor.

The obstacle detection sensor 171 detects the object, particularly the obstacle, present in the travelling (movement) direction of the mobile robot and transmits obstacle information to the controller 140. That is, the obstacle detection sensor 171 may detect a projecting object present on a movement path of a mobile robot, in the front or side, a furniture in the house, furniture, a wall, a wall edge, and the like and transmit the information to the controller 140.

At this time, the controller 140 detects the location of the obstacle based on at least two or more signals received through the ultrasonic sensor, and controls the movement of the mobile robot 100b according to the detected location of the obstacle to provide an optimal movement path when generating the map.

Depending on the embodiment, the obstacle detection sensor 171 provided on the outer surface of the case 110 may include a transmitter and a receiver.

For example, the ultrasonic sensor may be provided such that at least one transmitter and at least two receivers are staggered. Accordingly, signals can be radiated at various angles, and signals reflected by obstacles can be received at various angles.

Depending on the embodiment, the signal received from the obstacle detection sensor 171 may be subjected to a signal processing such as amplification and filtering, and then a distance and direction to the obstacle may be calculated.

Meanwhile, the sensing unit 170 may further include a travelling detection sensor that detects a travelling operation of the mobile robot 100b according to travelling of the main body 110 and outputs operation information. As the travelling sensor, a gyro sensor, a wheel sensor, an acceleration sensor, or the like can be used.

The mobile robot 100b may further include a battery detection unit (not shown) that detects a state of charge of the battery and transmits the detection result to the controller 140. The battery is connected to the battery detection unit so that the battery level and charge status are transmitted to the controller 140. The remaining battery power may be displayed on the screen of the output unit (not shown).

In addition, the mobile robot 100b includes an operation unit 137 capable of inputting on/off or various commands. Various control commands necessary for the overall operation of the mobile robot 100b may be received through the operation unit 137. In addition, the mobile robot 100b may include an output unit (not shown), and display reservation information, battery status, operation mode, operation status, and error status, etc.

Referring to FIG. 3, the mobile robot 100b includes the controller 140 for processing and determining various information such as recognizing a current location, and the storage unit 130 for storing various data. In addition, the mobile robot 100b may further include a communication unit 190 that transmits and receives data to and from other devices.

Among the devices that communicate with the mobile robot 100b, the external terminal has an application for controlling the mobile robot 100b, and through execution of the application, the mobile robot 100b displays the map of the travelling area to be cleaned, and specifies an area to clean a specific area on the map. The user terminal may communicate with the mobile robot 100b to display the current location of the mobile robot with the map, and information on a plurality of areas may be displayed. In addition, the user terminal updates and displays the location of the mobile robot according to the movement of the mobile robot.

The controller 140 controls the sensing unit 170, the operation unit 137, and the travelling unit 160 constituting the mobile robot 100b to control the overall operation of the mobile robot 100b.

The storage unit 130 records various information necessary for the control of the mobile robot 100b and may include a volatile or nonvolatile recording medium. The recording medium stores data that can be read by a microprocessor and is not limited to the type or implementation method.

In addition, the map for the travelling area may be stored in the storage unit 130. The map may be input by the user terminal, the server, or the like capable of exchanging information with the mobile robot 100b through wired or wireless communication or may be generated by the mobile robot 100b learning by itself.

The location of the rooms in the travelling area may be displayed on the map. In addition, the current location of the mobile robot 100b may be displayed on the map, and the current location of the mobile robot 100b on the map may be updated in the travelling process. The external terminal stores the same map as the map stored in the storage unit 130.

The storage unit 130 may store cleaning history information. Such cleaning history information may be generated each time cleaning is performed.

The map for the travelling area stored in the storage unit 130 includes a navigation map used for travelling during cleaning, a slam (Simultaneous localization and mapping) map used for location recognition, an obstacle, and the like. If it hits, it may be a learning map stored the corresponding information when an obstacle is encountered and use it for cleaning for learning, a global location map used for global location recognition, and an obstacle recognition map in which information about the recognized obstacle is recorded, and the like.

Meanwhile, as described above, maps may be separately stored and managed in the storage unit 130 for each use but the map may not be clearly classified for each use. For example, a plurality of pieces of information may be stored in one map for use in at least two or more purposes.

The controller 140 may include a travelling control module 141, a location recognition module 142, a map generation module 143, and an obstacle recognition module 144.

The travelling control module 141 controls travelling of the mobile robot 100b, and controls travelling of the travelling unit 160 according to the travelling setting. In addition, the travelling control module 141 may grasp the travelling route of the mobile robot 100b based on the operation of the travelling unit 160. For example, the travelling control module 141 can grasp the current or past moving speed, the distance traveled, etc. of the mobile robot 100b, and also grasp the history of changing the current or past direction based on the rotational speed of the travelling wheel. Based on the travelling information of the mobile robot 100b identified, the location of the mobile robot 100b on the map may be updated.

The map generation module 143 may generate the map of the travelling area. The map generation module 143 may process an image acquired through the image acquisition unit 120 to generate the map. For example, the map corresponding to the travelling area and the cleaning map corresponding to the cleaning area can be generated.

In addition, the map generation module 143 may recognize the global location by processing the image acquired through the image acquisition unit 120 at each location and linking it with the map.

In addition, the map generation module 143 may generate the map based on information obtained through the lidar sensor 175, and recognize a location based on the information obtained through the lidar sensor 175 at each location.

More preferably, the map generation module 143 may generate the map and perform location recognition based on information obtained through the image acquisition unit 120 and the lidar sensor 175.

The location recognition module 142 estimates and recognizes the current location. The location recognition module 142 uses the image information of the image acquisition unit 120 to grasp the location in connection with the map generation module 143 and the location recognition module 142 may estimate and recognize the current location even though the location of the mobile robot 100*b* suddenly changes.

The mobile robot 100*b* is capable of recognizing the location during continuous travelling through the location recognition module 142, and it is possible to learn the map and estimate the current location though the travelling control module 141, the map generation module 143, and the obstacle recognition module 144 without the location recognition module 142.

The mobile robot 100*b* acquires the acquired image through the image acquisition unit 120 at an unknown current location. Various features such as lights, edges, corners, blobs, and ridges located on the ceiling are identified through the image.

As such, the controller 140 may classify the travelling area and generate the map composed of a plurality of regions, or recognize the current location of the main body 110 based on the pre-stored map.

In addition, the controller 140 may fuse the information obtained through the image acquisition unit 120 and the lidar sensor 175 to generate the map and perform location recognition.

When the map is generated, the controller 140 may transmit the generated map to the external terminal, the server, or the like through the communication unit 190. Also, as described above, the controller 140 may store the map in the storage unit 130 when the map is received from the external terminal, the server, or the like.

In addition, when the map is updated while travelling, the controller 140 transmits the updated information to the external terminal so that the map stored in the external terminal and the mobile robot 100*b* is the same. As the map stored in the external terminal and the mobile robot 100*b* remains the same, for the cleaning command from the mobile terminal, the mobile robot 100*b* can clean the designated area, and the current location of the mobile robot 100*b* can be displayed on the external terminal.

At this time, the map is divided into a plurality of areas, the cleaning area includes a connection passage connecting the plurality of areas, and may include information on obstacles in the area.

When the cleaning command is input, the controller 140 determines whether the location on the map and the current location of the mobile robot match. The cleaning command may be input from a remote control, an operation unit or the external terminal.

If the current location does not match the location on the map, or if the current location cannot be confirmed, the controller 140 recognizes the current location and restores the current location of the mobile robot 100*b*, and then the controller 140 may be control to move the travelling unit 160 to the designated area based on the current location.

If the current location does not match the location on the map, or if the current location cannot be confirmed, the location recognition module 142 analyzes the acquired image from the image acquisition unit 120 and/or the terrain information acquired from the lidar sensor 175 and estimates the current location based on the map. In addition, the obstacle recognition module 144 or the map generation module 143 can also recognize the current location in the same way.

After recognizing the location and restoring the current location of the mobile robot 100*b*, the travelling control module 141 calculates a travelling route from the current location to the designated area and controls the travelling unit 160 to move to the designated area.

When receiving the cleaning pattern information from the server, the travelling control module 141 may divide the entire travelling area into a plurality of areas and set one or more areas as designated areas according to the received cleaning pattern information.

In addition, the travelling control module 141 may calculate the travelling route according to the received cleaning pattern information, travel along the travelling route, and perform cleaning.

When the cleaning for the set designated area is completed, the controller 140 may store a cleaning record in the storage unit 130.

In addition, the controller 140 may transmit the operation state or the cleaning state of the mobile robot 100*b* to the external terminal or the server at a predetermined cycle through the communication unit 190.

Accordingly, the external terminal displays the location of the mobile robot 100*b* along with the map on the screen of the running application based on the received data, and also outputs information about the cleaning state.

The mobile robot 100*b* according to the embodiment of the present disclosure moves in one direction until an obstacle or a wall surface is sensed, and when the obstacle recognition module 144 recognizes the obstacle, the robot 100*b* may determine travelling patterns such as straight and rotating.

For example, if the recognized obstacle attribute is a kind of obstacle that can be passed, the mobile robot 100*b* may continue to go straight. Or, if the attribute of the recognized obstacle is an obstacle that cannot be passed, the mobile robot 100*b* rotates to move a certain distance, and then moves to a distance in which the obstacle is detected in the opposite direction of the initial movement direction to travel in a zigzag form.

The mobile robot 100*b* according to an embodiment of the present disclosure may perform human or object recognition, and avoidance based on machine learning.

The controller 140 may include the obstacle recognition module 144 that recognize an obstacle previously learned by machine learning from an input image, and the travelling control module 141 that controls the travelling of the travelling unit 160 based on the attribute of the obstacle recognized.

The obstacle recognition module 144 may include an artificial neural network (ANN) in the form of software or hardware in which the attributes of the obstacle are learned.

For example, the obstacle recognition module 144 may include a deep neural network (DNN) such as a Convolutional Neural Network (CNN), a Recurrent Neural Network (RNN), or a Deep Belief Network (DBN) trained by Deep Learning.

The obstacle recognition module 144 may determine the attribute of the obstacle included in input image data based on weights between nodes included in the deep neural network (DNN).

Meanwhile, the mobile robot 100b may further include an output unit 180 to display predetermined information as an image or output it as sound.

The output unit 180 may include a display (not shown) that displays information corresponding to the user's command input, a processing result corresponding to the user's command input, an operation mode, an operation state, and an error state.

According to an embodiment, the display may be configured as a touch screen by forming a mutual layer structure with a touch pad. In this case, the display composed of the touch screen may be used as an input device capable of inputting information by a user's touch in addition to the output device.

In addition, the output unit 180 may include an audio output unit (not shown) that outputs an audio signal. Under the control of the controller 140, the sound output unit may output an alert message such as a warning sound, an operation mode, an operation state, an error state, information corresponding to a user's command input, and a processing result corresponding to a user's command input as sound. The audio output unit may convert the electrical signal from the controller 140 into an audio signal and output the converted audio signal. To this end, a speaker or the like may be provided.

Hereinafter, a control method for generating maps of the mobile robots 100 and 100b of FIG. 1 or 2 having the configuration diagram of FIG. 3 will be described.

Figure 4:
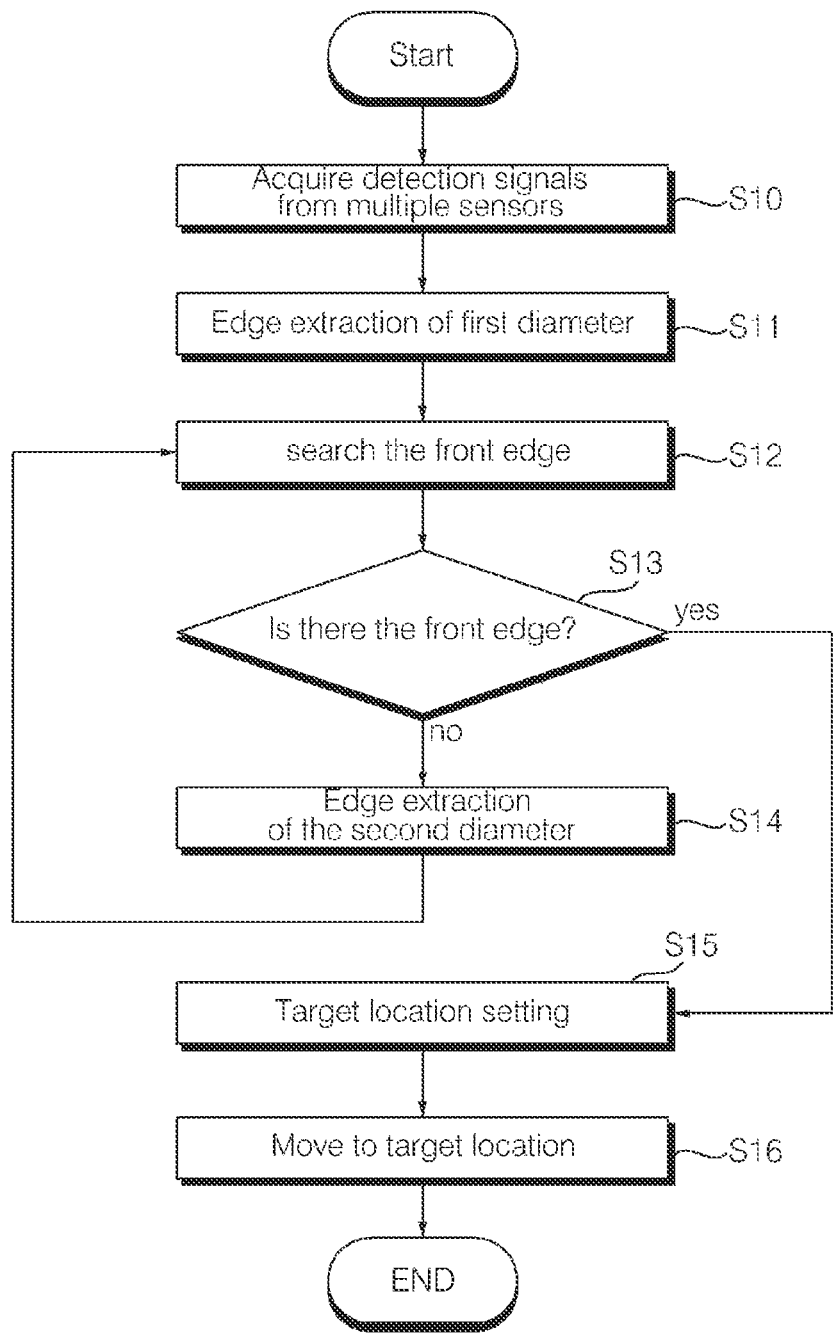
FIG. 4 is a flowchart illustrating a method for controlling the mobile robot according to the embodiment of the present disclosure.
Figure 5:
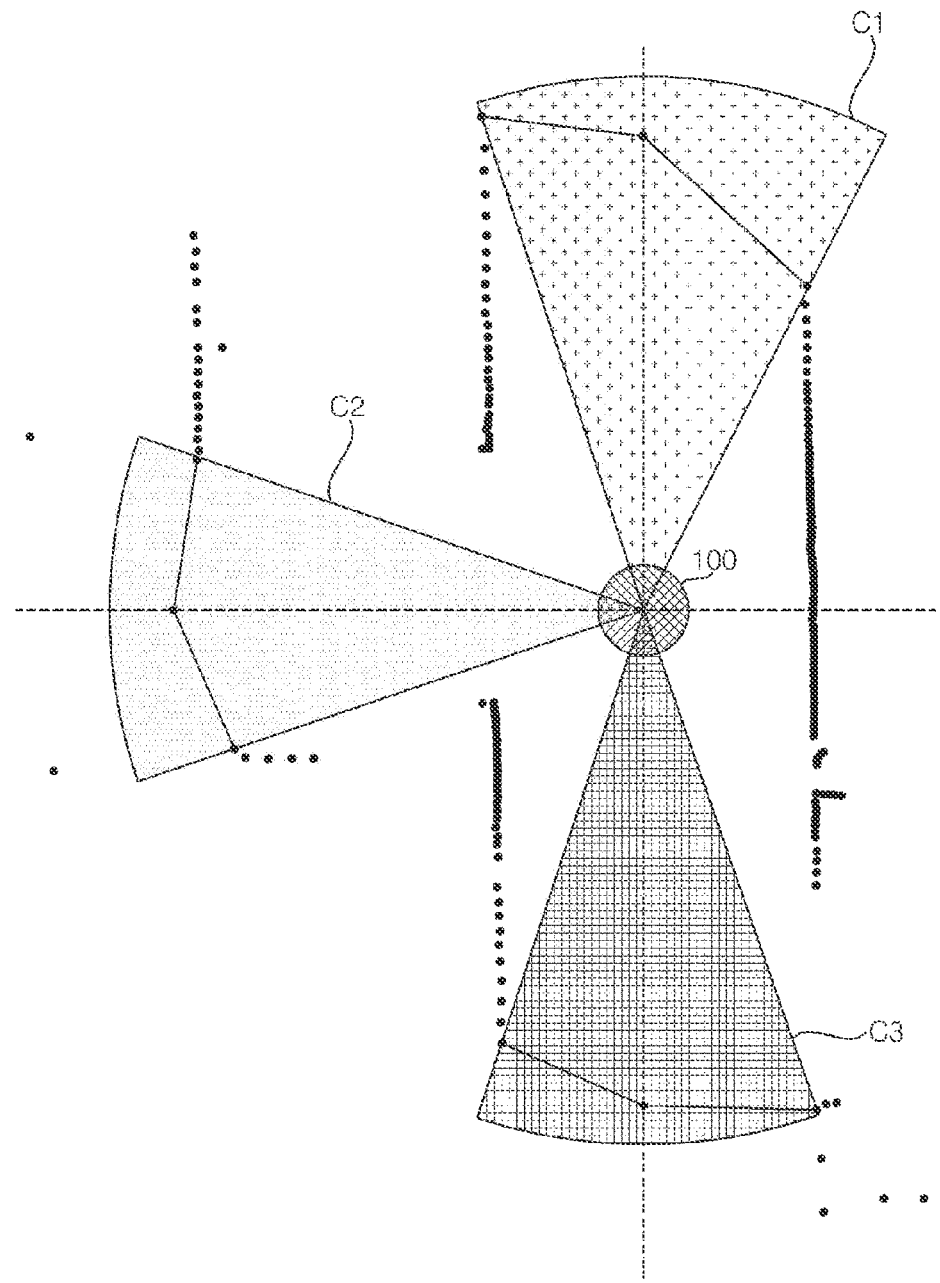
FIGS. 5 and 6A-6C are views referred to for explanation of the method for controlling of FIG. 4.

FIG. 4 is a flowchart illustrating a control method of the mobile robot according to an embodiment of the present disclosure, and FIGS. 5 and 6 are views for reference to the description of the control method of FIG. 4.

Referring to FIG. 4, the mobile robot 100 according to an embodiment of the present disclosure receives a travelling command for generating the map by a command of the controller 140.

The mobile robot 100 acquires detection information about the surrounding environment while travelling in the cleaning area according to the travelling command.

Specifically, the mobile robot 100 acquires the image at each point from the image acquisition unit 120 while travelling. For example, the image acquisition unit 120 may acquire an image such as a ceiling by photographing toward the upper side of the mobile robot 100 (S10).

In addition, while the mobile robot 100 is travelling, the travelling obstacle element may be detected using the sensing unit 170 and the image acquisition unit 120.

The mobile robot 100 may detect a travelling obstacle at each point. For example, the mobile robot 100 may periodically detect the outer surface of the wall, which is one of the travelling obstacles at a specific point.

The controller 140 acquires information on whether there is the obstacle in the surrounding environment based on the detection signal obtained in four directions according to the 360° rotation of the lidar sensor 175.

The controller 140 may generate more accurate obstacle information by fusing the detection signal of the rider sensor 175 with the detection signal detected by the wheel sensor. For example, the controller 140 may generate more accurate obstacle information by fusing the sensing data from the travelling detecting sensor and the result of ICP (Iterative Closest Point) matching of the lidar sensor 175.

According to the present disclosure, the heterogeneous data is complementarily applied to each other by utilizing the image information of the camera sensor and the distance information of the lidar sensor 175. Through this, it is possible to compensate for disadvantages that are vulnerable to low illumination when only images are used in the slam, and to respond to dynamic environments that occur when only the lidar sensor 175 is used.

Slam technology can be divided into vision-based slam and laser-based slam.

Among them, the vision-based slam extracts feature points from the image, matches them, calculates three-dimensional coordinates, and makes the slam based on them. Because there is a lot of information in the image, it has excellent performance for self-recognition when the environment is bright, but it is difficult to operate in a dark place, and there is a scale drift problem, such as recognizing that a small-sized object in the close range is similar to a large-sized object in the long range.

And laser-based slam works by using a laser to measure the distance for each angle to calculate the geometry of the surrounding environment. Laser-based slam works well in dark environments. However, since the location is recognized only with the geometry information, it is often difficult to find a location in the space where there are many repetitive areas such as an office environment without an initial location condition. In addition, it is difficult to respond to dynamic environments such as furniture being moved.

That is, in the case of the vision-based slam, accurate operation is difficult in a dark environment (an environment without light). In addition, in case of laser-based slam, it is difficult to recognize the self-location in a dynamic environment (moving object, etc.) and in a repeated environment (similar pattern), and the accuracy of matching the existing map with the current frame and loop-closing of is reduced. Because it is difficult to create a landmark, it is difficult to deal with situations such as kidnap problems.

The detection signal acquired by the lidar sensor 175 includes a screen indicating the width, depth, and center of the space of the travelling area in four directions to be received when the mobile robot 100 rotates by 90 degrees relative to the direction in which the mobile robot 100 travels as shown in FIG. 5.

At this time, as shown in FIG. 5, when obtaining the screen in four directions for the passage of the travelling area based on the real-time lidar, the free edge (free edge) may be defined as each screen for the four directions. At this time, the free edges C1, C2, and C3 may be formed of arcs drawn by both end points of the passage and the radius of the lidar in the screen read by the lidar.

The free edges C1, C2, and C3 may include information about the width of the empty passage in the corresponding direction, location information of the empty passage, and information about the center point of the passage, and information about the angle between both end points of the passage and the center line of the mobile robot 100 (the current direction of travel of the mobile robot and the line extended by 90 degree.

The screen of the lidar sensor 175 that is read periodically is a lidar screen of the quadrant of the mobile robot 100, and arcs drawn by the lidars on each screen, that is, the open space of the passage are free edges C1, C2, and C3, and it includes specific information about the location of the obstacle in the quadrant of the mobile robot 100.

Next, the controller 140 extracts the free edges C1, C2, and C3, respectively when the radius of the lidar sensor 175 is the first diameter D1 on the lidar screen of the quadrant of the mobile robot 100 for center movement (S11).

That is, when setting the rider radius as the first diameter D1, the passage of the travelling area, that is, the edge between the obstacle and the edge of the first diameter D1 generated by the rider information is extracted.

The first diameter D1 may be, for example, 6 m or less, and preferably 4 m.

By setting the first diameter D1 of the lidar sensor 175 to 4 m, the free edge from the lidar detection signal is extracted, and it is searched whether there is a front edge among the extracted free edges (S12).

The front edge includes information on the direction in which the mobile robot 100 will move next, and is an edge disposed on the path that the mobile robot 100 passes as it moves next. This front edge is one of the four free edges.

Figure 6A:
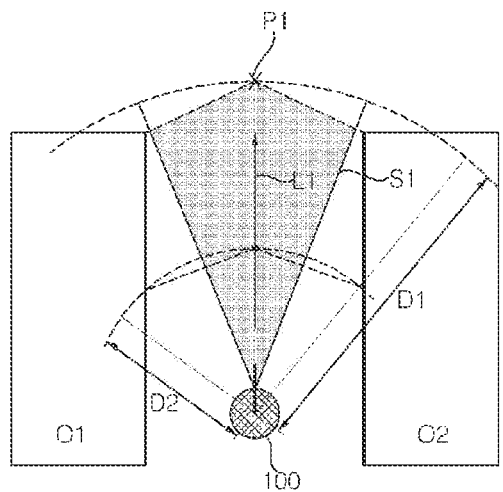

According to the lidar detection signal set to the first diameter D1 as shown in FIG. 6A, when the arc line formed by the lidar detection signal exposed between the two end points of the two walls forming the passage forms the front edge, the location of the target P1 is set on the arc line formed by the lidar detection signal (S15).

The target P1 location is defined as a point where the mobile robot 100 will move next, and when the target P1 location is set, the mobile robot 100 moves linearly from the current location to the target P1 location.

On the other hand, if the front edge does not exist from the lidar detection signal of the first diameter D1 (S13), the controller 140 corrects the detection radius of the lidar sensor 175 to the second diameter D2 again. The detection signal is read (S14).

At this time, the second diameter D2 is smaller than the first diameter D1, and when the first diameter D1 is 4 m, the second diameter D2 may be 3 m smaller than that, preferably 2 m.

When the sensing radius of the lidar sensor 175 is reduced as described above, the angle of the arc formed by the detection signal of the lidar sensor 175 obtained in each direction becomes larger.

That is, when the sensing radius of the lidar sensor 175 is reduced to the second diameter D2 as shown in FIG. 6A, the distance to the target P to be locationed on the arc decreases as the arc angle increases. Therefore, a straight line movement is possible between the narrow distances to the target P.

Figure 6B:
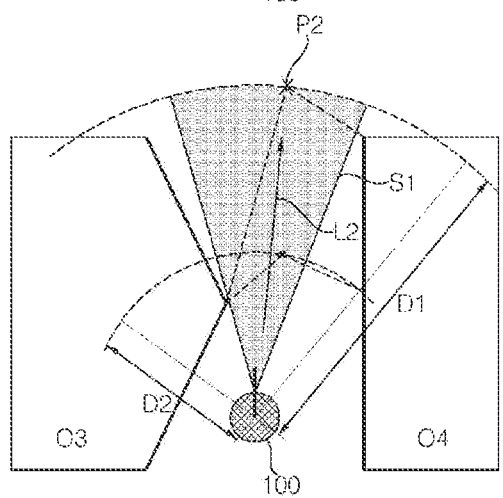

In the case of FIG. 6B, when one wall O3 of the two walls O3 and O4, which is the obstacle forming the passage, protrudes, and a part of the front of the mobile robot 100 is covered, accordingly, the detection signal obtained from the lidar sensor 175 decreases the angle of the arc with respect to the same first diameter D1 compared to the detection signal of FIG. 6A.

At this time, in the case of FIG. 6B, even if the angle of the arc by the first diameter D1 is reduced than in FIG. 6A, the degree of passage through the reduced arc angle to form the front edge, that is, the width that the mobile robot 100 can pass is satisfied and then the mobile robot 100 travels to the target P2 while performing the central movement L2 through the corresponding passage (S16).

Figure 6C:
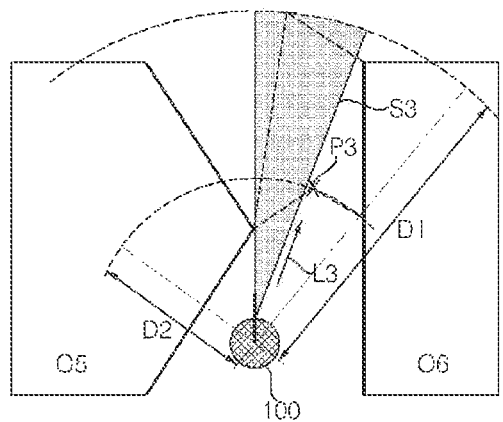

However, as illustrated in FIG. 6C, when the angle formed by the arc of the lidar detection signal by the first diameter D1 is significantly small to block the front surface of the mobile robot 100, it is reset to the second diameter D2 to obtain the lidar detection signal again.

In the case of FIG. 6C, the front edge may be extracted by the lidar detection signal by the second diameter D2, and the target P3 location may be set such that the mobile robot 100 moves to the center L3 on the front edge.

Thus, by performing the center moving while performing the mapping of the cleaning area, it is possible to obtain information without the travelling of the mobile robot 100 is changed abruptly.

Therefore, when proceeding with mapping, errors due to rapidly changing travelling are not included in the mapping, and mapping with relatively accurate information is possible.

At this time, the center movement means that the mobile robot 100 travels as far as possible through the center with respect to the front edge, and by such center movement, the mobile robot 100 obtains the detection signal in four directions from each sensor. Therefore, as the avoidance of the obstacle O is made, mapping including more information is possible.

That is, when the mobile robot 100 obtains information while being biased on one wall, the information on the biased wall cannot be obtained properly, so that the controller 140 controls the travel of the mobile robot 100 to move along the center of the passage.

As described above, when the target P is set, the controller 140 performs center movements L1, L2, and L3 that move along the center of the passage when the mobile robot 100 moves straight toward the target P (S16).

The mobile robot 100 performs the center movement toward the target P, and obtains the detection signal from each sensing unit 170 to perform mapping.

Hereinafter, the operation of setting the front edge of the controller 140 of the present disclosure will be described in detail with reference to FIGS. 7 to 9.

Figure 7:
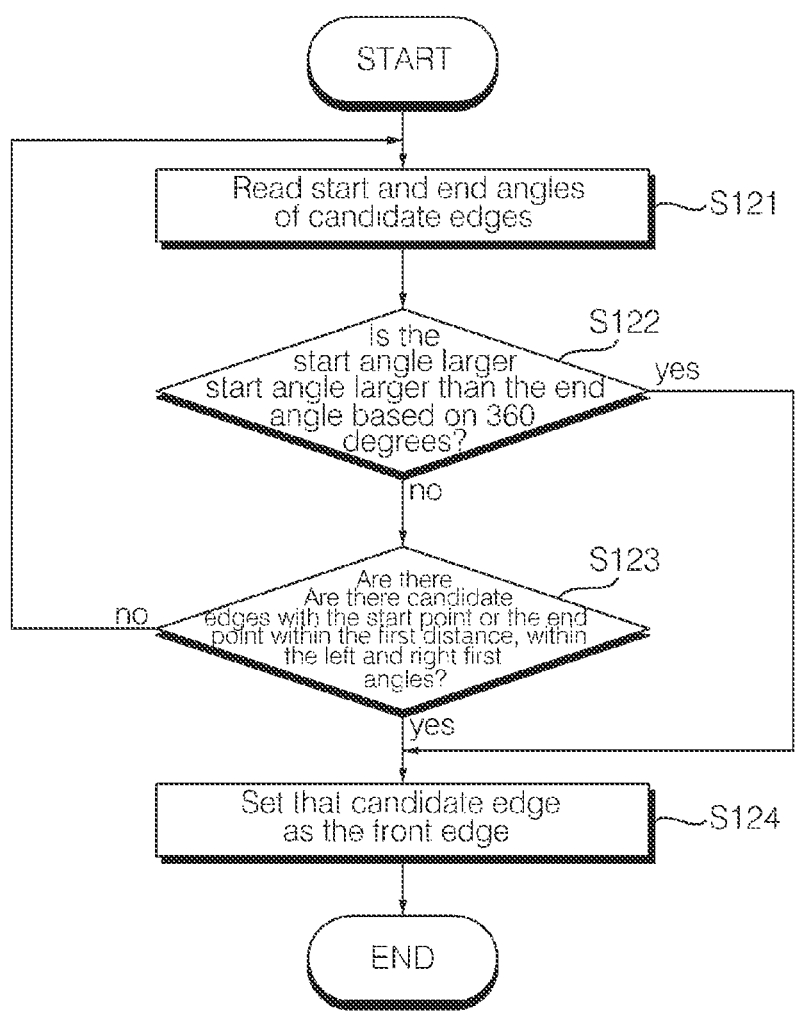
FIG. 7 is a detailed flowchart of setting the front edge of FIG. 4.

First, FIG. 7 is a detailed flowchart for setting the front edge of FIG. 4, and FIGS. 8A-8D and 9 are views referred to for explanation of the control method of FIG. 7.

Referring to FIG. 7, the controller 140 of the mobile robot 100 obtains information about candidate edges from the lidar screen for four directions.

At this time, in the description, the lidar screen of the mobile robot 100 has been described as being obtained from four directions, that is, four directions when rotating by 90 degrees with respect to the current movement direction, but is not limited thereto.

That is, 8, 12 or 16 screens can be obtained as candidate edge screens depending on the setting.

First, the controller 140 reads the angles of the start point and end point of a plurality of obtained candidate edges (S121).

At this time, the start point is defined as the scan start point of the lidar forming the lidar arc of the lidar screen, and the end point is defined as the scan end point of the lidar forming the lidar arc of the lidar screen.

The controller 140 measures the angle from the center line of the mobile robot 100 at the start point and the end point, respectively, and defines each as a start angle and an end angle.

The controller 140 reads the start angle and the end angle of each candidate edge, and defines the corresponding edge as the front edge when the start angle is greater than the end angle based on 360 degrees (S133).

In this case, 360° means the center line of the mobile robot 100 and compares the size of the angle formed between each start point and the center line of the mobile robot 100 with the angle formed between each end point and the center line, and determines if the size of the angle of the start point is larger.

As an example, candidate edges may be searched as shown in FIGS. 8A to 8D.

Figure 8A:
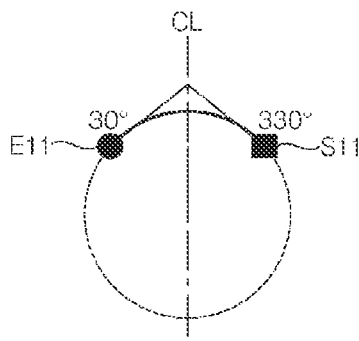
FIGS. 8A-8D and 9 are views referred to for explanation of the method for controlling of FIG. 7.

In the case of FIG. 8A, the angle of the starting point S1 meets 330° based on 360°, that is, the center line of the mobile robot 100, and the angle of the end point (E11) meets 30° based on 360°.

That is, as the passage in which the start point and the end point are located in different directions based on the center line of the mobile robot 100, it means that the front of the mobile robot 100 is open in the moving direction.

Therefore, as shown in FIG. 8A, since the angle of the start point S11 is larger, the corresponding candidate edge may be set as the front edge.

Figure 8B:
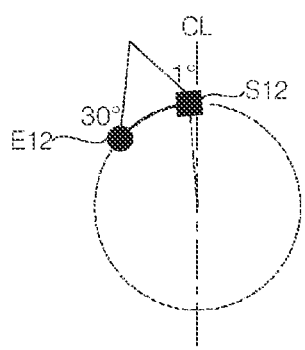

On the other hand, when the angle of the start point S12 meets 1° based on 360°, that is, based on the center line of the mobile robot 100, and the angle of the end point E12 is 30°, as shown in FIG. 8B, it cannot be set as the front edge since they do not meet the conditions.

Figure 8C:
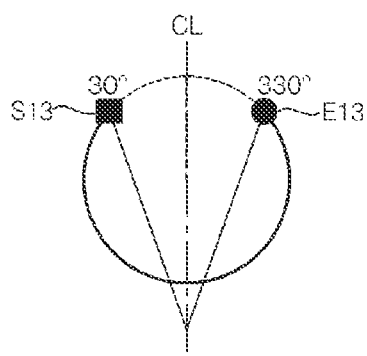

In addition, in the case of FIG. 8C, the start point S13 of the arc of the candidate edge meets 30°, the angle of the end point E13 meets 330°, and the start point has a smaller angle based on 360°.

This indicates that the obstacle O is disposed in front of the mobile robot 100 and therefore cannot be set as the front edge.

Figure 8D:
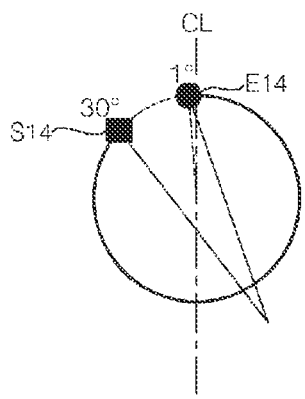

In addition, when the angle of the start point S14 of the arc of the candidate edge meets 30° as shown in FIG. 8D, and the end point E14 meets 1° based on 360°, this means that the obstacle O is located by combing from the front of the mobile robot 100 to the left. Therefore, the corresponding edge can be set as the front edge.

As such, in the case of FIGS. 8A and 8D, the corresponding candidate edge may be set as the front edge.

Figure 9:
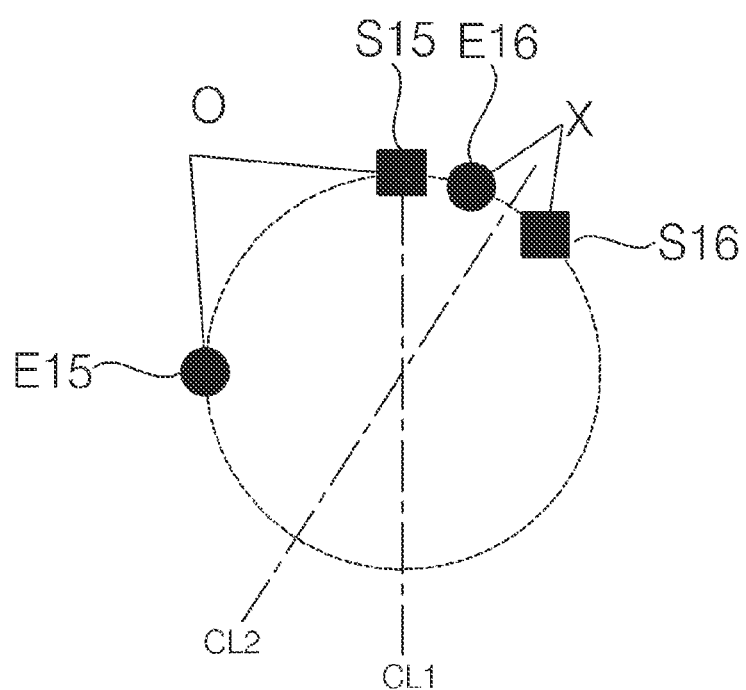

On the other hand, if there is no candidate edge corresponding to the corresponding front edge among the read candidate edges, within the first distance D1 from the mobile robot 100 as shown in FIG. 9, the controller 140 determines if there are candidate edges where the start point S15, S16 or the end point E15, E16 based on 360° are within the first angle (S123).

That is, as shown in FIG. 9, the start point S15, S16 or end point E15, E16 exist within the first distance from the current mobile robot 100, and the start point S15, S16 or the end point E15 is determined to be present within a first angle from 360°, the center line of the mobile robot 100.

At this time, the first distance may be any one of 2 m to 4 m, and preferably 2.5 m. In addition, the first angle may be an angle between 10° and 30° from the center line of the mobile robot 100 to the left and right, preferably 15°.

Accordingly, when the start points S15 and S16 or the end points E15 and E16 are present within the first angle from the center line of the mobile robot 100, the corresponding candidate edge may be set as the front edge (S124).

In this case, when two or more candidate edges satisfying the above conditions among the four candidate edges, the candidate edge having an angle closer to the center line of the mobile robot 100 may be set as the front edge.

When the front edge is set as described above, the controller 140 sets the target P, which is the next moving target of the mobile robot 100.

Hereinafter, the setting of the target P will be described with reference to FIGS. 10 and 11.

Figure 10:
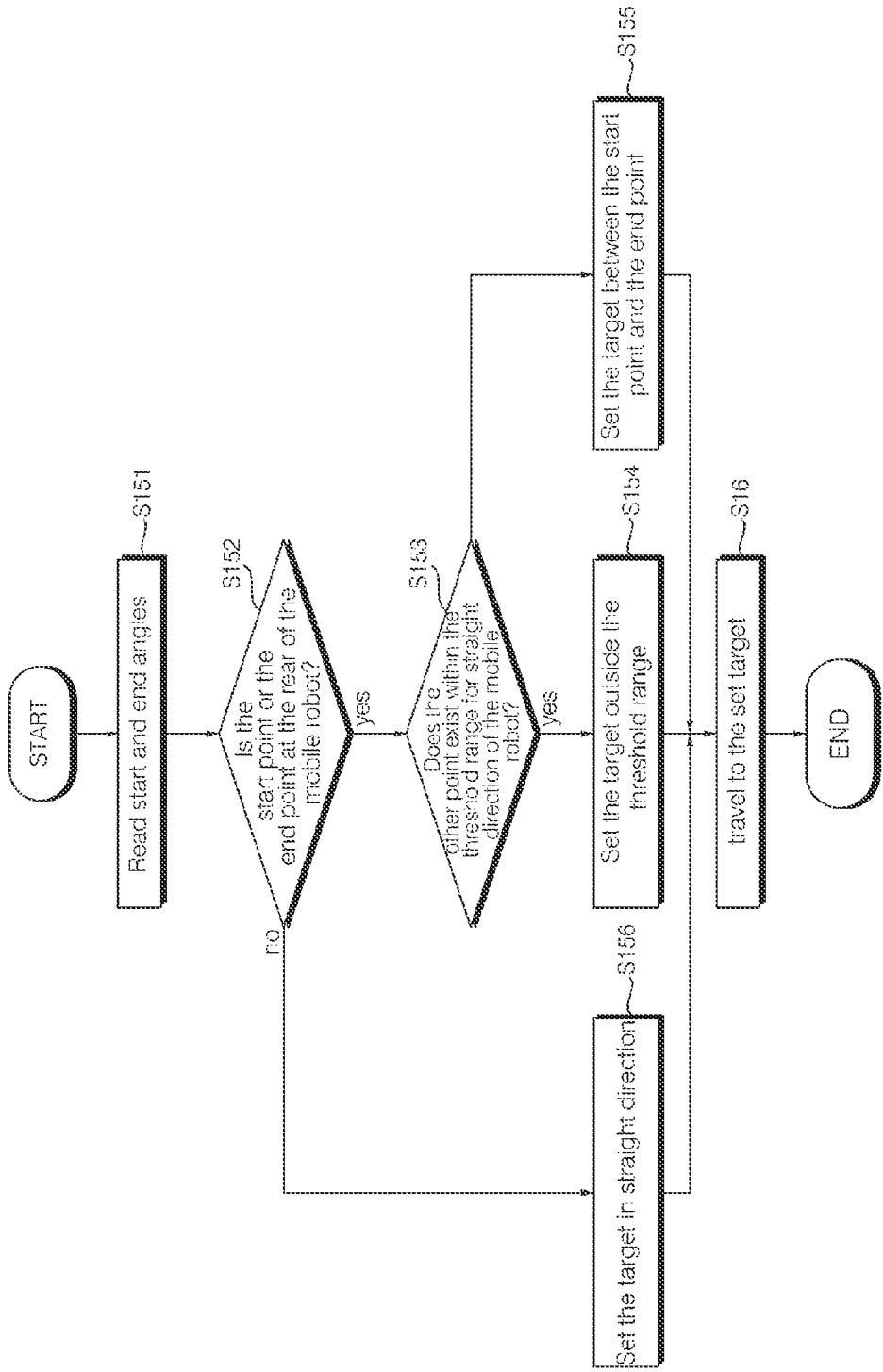
FIG. 10 is a detailed flowchart of target setting in FIG. 7.

FIG. 10 is a detailed flowchart of target P setting in FIG. 7, and FIGS. 11A-11C are views referred to for a description of the control method of FIG. 10.

Referring to FIG. 10, when the front edge is set, the corresponding front edge is checked (S151).

Next, it is checked whether the start point or the end point of the corresponding front edge is behind the mobile robot 100 (S152).

Figure 11A:
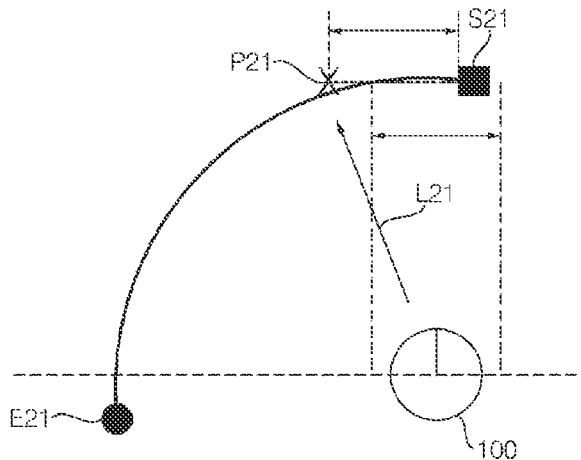
FIGS. 11A-11C are views referred to in the description of the control method of FIG. 10.
Figure 11B:
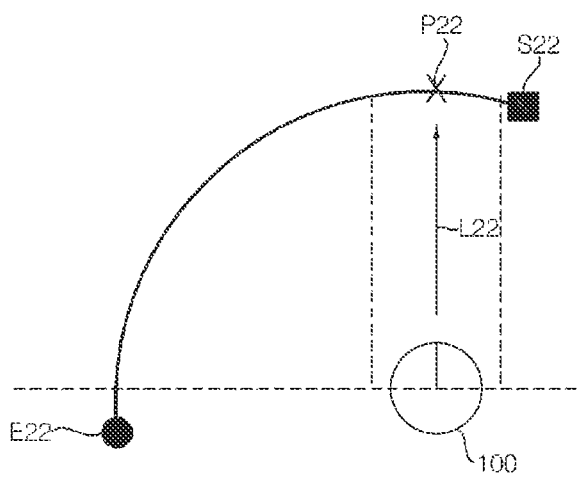
Figure 11C:
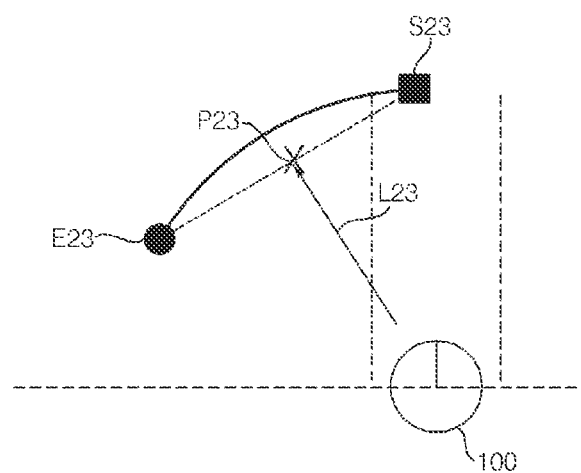

Referring to FIGS. 11A to 11C, if the end points E21 and E22 are located at a rear side with respect to the location of the mobile robot 100, it is determined whether the start points S21 and S22 which are other points not located at the rear side of the mobile robot 100 is present within the threshold range from the straight direction of the mobile robot 100, that is, from the center line of the mobile robot 100 (S153).

In this case, the threshold range may be a range that satisfies a predetermined distance from the center line of the mobile robot 100, and preferably, within a distance of 300 mm or less from the center line to the right and left sides. Or more preferably, it may satisfy within a distance of 150 mm or less from the center line to the left and right.

As shown in 11A, when the end point E21 is located rearward with respect to the location of the mobile robot 100, and the start point S21 is within the threshold range from the center line, the target P21 is set at a position outside the end point of the threshold range near the start point S21 (S154).

That is, when the threshold range is 150 mm, in the direction from the start point S21 toward the end point E21, the target P21 is set at a distance spaced by 150 mm or more so as to deviate the threshold range.

For example, when the threshold range is 150 mm, a point spaced apart from the start point S21 by the width of the mobile robot 100 may be set as a target P21 distance.

On the other hand, even if the end point E22 is located at the rear of the mobile robot 100 as shown in FIG. 11B, if the remaining point, the start point S22, is outside the threshold range, the intersection point between the center line of the mobile robot 100 and the lidar arc drawn by the front edge may be set as the target P22.

That is, the target P can be set so that the mobile robot 100 can move straight in the current direction (S155).

On the other hand, if neither of the start point S23 or the end point E23 is present in the rear of the mobile robot 100, target P23 may be set between the start point S23 and the end point E23 above the lidar arc drawn by the front edge as shown in FIG. 11C.

At this time, the target P23 may be set as the center point of the start point S23 and the end point E23 (S156).

As described above, when the target P23 is set, the controller 140 controls the travelling unit 160 of the mobile robot 100 and moves straight while performing the center movement toward the target P (S16).

As described above, By fusing the detection information obtained through the camera of the lidar sensor 175 and the image acquisition unit 120, etc., obtaining information about the front edge and setting the next moving target P, it is possible to drive through the center of the passage without colliding with the obstacle O when mapping is performed.

Therefore, it is possible to perform the mapping without error by travelling while acquiring the surrounding information for the four directions without a rapid speed change and a sudden angle change.

Hereinafter, another embodiment of the present disclosure in which mapping is performed by additionally using an ultrasonic sensor will be described with reference to FIGS. 12A and 12B.

Figure 12A:
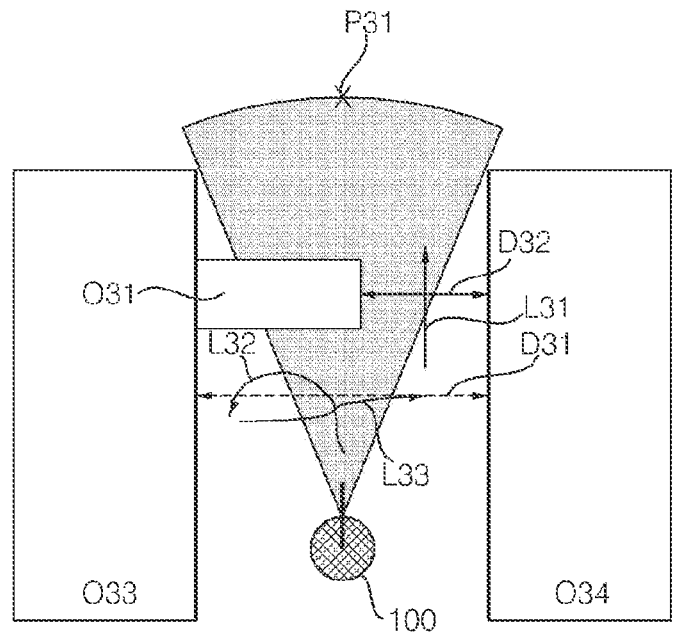
FIGS. 12A and 12B are views showing a control method of the mobile robot according to another embodiment of the present disclosure.
Figure 12B:
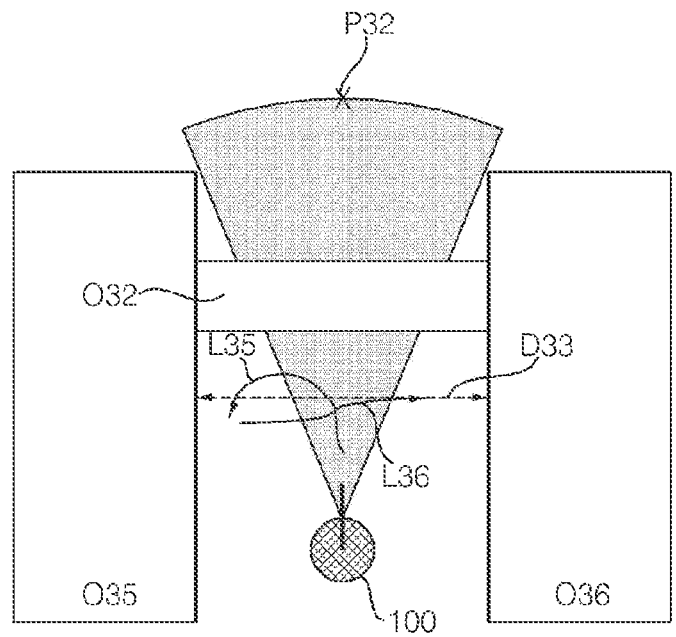

FIGS. 12A and 12B are views showing a control method of the mobile robot 100 according to another embodiment of the present disclosure.

Referring to FIGS. 12A and 12B, when the detecting signal is obtained from the camera of the image acquisition unit 120 and the lidar sensor 175, obstacles O31 protruding between the walls O33, 34 forming the passage may not be detected as shown in FIGS. 12A and 12B.

For example, the obstacle O31 may be glass or the like through which the laser passes, or the case of the pierced obstacle O31 may correspond to this.

At this time, according to another embodiment of the present disclosure, the mobile robot 100 further includes an ultrasonic sensor as an obstacle detection sensor to obtain the detection signal from the ultrasonic sensor, and fuses with the detection signal from the camera and the lidar sensor 175 to proceed driving for mapping.

Specifically, when the detection signal from the ultrasonic sensor is additionally performed to fused after setting the target P31 using the detection signal from the lidar sensor 175 and the camera, the obstacle O31 protruding as shown in FIG. 12A can be found.

At this time, the controller 140 performs a straight travelling toward the target P31 according to the detection from the ultrasonic sensor, and then performs an avoidance travelling when there is the obstacle O31 protruding from the left side.

That is, when the passage exists between the obstacle O31 and the facing wall O34 as shown in FIG. 12A, it is determined whether the width D32 of the passage is greater than the width of the mobile robot 100, and the mobile robot 100 performs the avoidance travelling when it is greater than the width of the mobile robot 100 as shown in FIG. 12a.

That is, after performing the rotational travelling L32 toward the obstacle O31 from the straight travelling toward the target P31, the travelling L33 in a direction perpendicular to the straight travelling proceeds to the front of the passage and travelling L33 proceeds to reach the target P31 through the passage.

It is possible to design to avoid the obstacles O31 that are not detected from the lidar sensor 175 and the camera through the avoidance travelling.

On the other hand, if the obstacle O32 discovered as shown in FIG. 12B completely blocks the passage, or when the passage between the obstacle O32 and the facing wall has a width that the mobile robot 100 cannot pass, after performing rotational driving L35 to the left or right and performing linear driving L36 perpendicular to the driving direction, the information on the obstacle O32 is mapped and the direction is switched to drive.

The present disclosure implements a location recognition algorithm by utilizing heterogeneous sensors with different physical characteristics as a technique for securing high location recognition performance in various environments.

That is, the controller 140 may set the target P capable of center movement and then travel during mapping travelling from the image information and the lidar sensing information. In addition, it is possible to avoid the obstacle O by using the ultrasonic sensor.

In the present disclosure, the characteristics of the heterogeneous sensor of the camera sensor and the lidar sensor 175 can be complementarily applied to improve the slam performance.

The mobile robot according to the present disclosure is not limited to the configuration and method of the embodiments described as described above, the embodiments are all or a part of each embodiment is selectively combined so that various modifications can be made It may be configured.

Likewise, although the operations are depicted in the drawings in a particular order, it should not be understood that such operations should be performed in the particular order shown or in sequential order, or that all shown actions should be performed in order to obtain desirable results. In certain cases, multitasking and parallel processing may be advantageous.

On the other hand, the control method of the mobile robot according to an embodiment of the present disclosure, it is possible to implement the processor-readable code on a recording medium that can be read by the processor. The processor-readable recording medium includes all types of recording devices in which data that can be read by the processor are stored. It also includes those implemented in the form of carrier waves such as transmission over the Internet. In addition, the processor-readable recording medium can be distributed over network coupled computer systems so that the processor-readable code is stored and executed in a distributed fashion.

In addition, although the preferred embodiments of the present disclosure have been illustrated and described above, the present disclosure is not limited to the specific embodiments described above, and the technical field to which the present disclosure pertains without departing from the gist of the present disclosure claimed in the claims. In addition, various modifications can be implemented by those skilled in the art, and these modifications should not be individually understood from the technical idea or prospect of the present disclosure.

Mobile robot: 100, 100b
Main body: 110
Operation unit: 137
Controller: 140
Service unit: 150
Travelling unit: 160
Sensing unit: 170
Communication unit: 190
Lidar sensor: 175

What is claimed is:

1. A mobile robot comprising:
a traveling unit configured to move a main body of the mobile robot;
a lidar sensor configured to acquire terrain information outside the main body;
a camera sensor configured to acquire an image outside the main body; and
a controller configured to fuse the image and a detection signal of the lidar sensor in the absence of a base map, to obtain a plurality of candidate edge screens from screens of the lidar sensor in a plurality of directions centered on the main body, to select one of the plurality of candidate edge screens as a front edge for a next movement of the mobile robot, and set a target location of the next movement at the front edge to perform mapping travelling,
wherein the front edge includes information on a direction for the next movement of the mobile robot, and is an edge disposed on a path that the mobile robot passes as it moves next,
wherein the controller is configured to acquire the candidate edge screen for four directions of the mobile robot from the image and the detection signal of the lidar sensor and select one of the candidate edge screens as the front edge, wherein the controller is configured to select, as the front edge, the candidate edge screen that has no obstacles in a straight direction of the mobile robot among the candidate edge screens, and wherein the controller is configured to reduce a detection radius of the lidar sensor when an angle of an arc drawn by the detection signal of the lidar sensor on the candidate edge screen is smaller than a threshold angle.

2. The mobile robot of claim 1, wherein when one of a start point and end point of the arc of the detection signal detected by setting the detection radius of the lidar sensor to a first distance disposed in the front surface of the mobile robot, the controller is configured to set the detection radius of the lidar sensor as a second distance smaller than the first distance.

3. The mobile robot of claim 2, wherein the first distance is 4 m, and the second distance is 2 m.

4. The mobile robot of claim 2, wherein when an angle from the start point of the arc of the detection signal to a center line of the mobile robot in the candidate edge screen has a greater angle with respect to the center line than the end point, the controller is configured to set the candidate edge as the front edge.

5. The mobile robot of claim 4, wherein the controller is configured to select the candidate edge where any one of the start point or the end point of the arc of the detection signal is within a threshold range with respect to the center line of the mobile robot as the front edge.

6. The mobile robot of claim 5, wherein when there are two or more candidate edges where any one of the start point and the end point of the arc of the detection signal is present, the controller is configured to select the candidate edge closer to the center line as the front edge.

7. The mobile robot of claim 6, wherein when the start point and the end point are not present at a rear of the mobile robot with respect to the front edge, the controller sets a target between the start point and the end point.

8. The mobile robot of claim 7, wherein when the start point or the end point is present at the rear of the mobile robot with respect to the front edge, the controller is configured to determine whether an other of the start point or end point is within a predetermined distance from the center line of the mobile robot.

9. The mobile robot of claim 8, wherein when the start point or the end point is present at the rear of the mobile robot with respect to the front edge, and the other of the start point or the end point is within the predetermined distance from the center line of the mobile robot, the controller is configured to set the target to be out of the predetermined distance from the center line.

10. The mobile robot of claim 2, wherein the controller is configured to control to perform a central movement that moves along a center of a passage when the mobile robot moves straight toward a target.

11. The mobile robot of claim 10, wherein the controller is configured to obtain the detection signal from the lidar sensor and the image and perform mapping to a travelling area when the mobile robot moves straight.

12. The mobile robot of claim 10, further comprising an ultrasonic sensor configured to determine a presence or absence of an obstacle located in front by ultrasonic radiation, wherein the controller is configured to avoid the obstacle when traveling toward the target according to a detection signal from the ultrasonic sensor.

13. A method of controlling of a mobile robot, the method comprising:

acquiring terrain information outside a main body of the mobile robot through a lidar sensor;

obtaining images outside the main body through a camera sensor;

obtaining a plurality of candidate edge screens from screens of the lidar sensor in a plurality of directions centered on the main body based on a detection signal of the lidar sensor in a state in which there is no base map;

selecting one of the plurality of candidate edge screens as a front edge to be moved to next by the mobile robot;

setting a target location at the front edge; and performing travelling to the target location, wherein the selecting the front edge is performed by extracting a candidate edge screen by reducing a detection radius of the lidar sensor to sense when an angle of an arc drawn by the detection signal of the lidar sensor on the candidate edge screen is smaller than a threshold angle, wherein the front edge includes information on a direction for a next movement of the mobile robot, and is an edge disposed on a path that the mobile robot passes as it moves next, and wherein the selected candidate edge screen does not include obstacles in a straight direction of the mobile robot.

14. The method of claim 13, wherein when one of a start point and an end point of the arc of the detection signal detected by setting the detection radius of the lidar sensor to a first distance disposed in the front surface of the mobile robot, the selecting the front edge is sensed by setting the detection radius of the lidar sensor as a second distance smaller than the first distance.

15. The method of claim 14, wherein when the start point of the arc of the detection signal with respect to a center line of the mobile robot in the candidate edge screen has a greater angle with respect to the center line than the end point, the selecting the front edge is configured to set the candidate edge as the front edge.

* * * * *